United States Patent [19]

Zbed

[11] Patent Number: 4,898,209

[45] Date of Patent: Feb. 6, 1990

[54] SLIDING RECONSTITUTION DEVICE WITH SEAL

[75] Inventor: Brian D. Zbed, Round Lake Park, Ill.

[73] Assignee: Baxter International Inc., Deerfield, Ill.

[21] Appl. No.: 249,747

[22] Filed: Sep. 27, 1988

[51] Int. Cl.[4] .............................................. F16L 37/28

[52] U.S. Cl. ............................... 137/614.04; 604/413; 604/414; 251/149.1

[58] Field of Search ............... 604/413, 411, 410, 414, 604/416, 88; 137/614.04; 206/221; 220/265

[56] References Cited

U.S. PATENT DOCUMENTS

| | | | |
|---|---|---|---|
| 2,362,025 | 11/1944 | Price . | |
| 2,724,383 | 11/1955 | Lockhart . | |
| 3,336,924 | 7/1967 | Sarnoff et al. . | |
| 3,392,726 | 7/1968 | Pochyla et al. . | |
| 3,788,369 | 1/1974 | Killinger . | |
| 3,872,867 | 3/1975 | Killinger | 604/413 |
| 3,995,630 | 12/1976 | van de Veerdonk . | |
| 4,614,267 | 9/1986 | Larkin | 206/221 |
| 4,614,515 | 9/1986 | Tripp | 604/403 |
| 4,624,667 | 11/1986 | Rutuarak . | |
| 4,675,020 | 6/1987 | McPhee | 604/411 |
| 4,757,911 | 7/1988 | Larkin | 220/265 |
| 4,781,679 | 11/1988 | Larkin . | |
| 4,784,259 | 11/1988 | Grabenkort | 206/221 |
| 4,784,658 | 11/1988 | Grabenkort | 604/410 |

*Primary Examiner*—Stephen C. Pellegrino
*Attorney, Agent, or Firm*—Paul E. Schaafsma; Bradford R. L. Price; Paul C. Flattery

[57] ABSTRACT

A coupling device for establishing fluid communication between a first container and a second container is provided. The device includes a first sleeve member including at a first end thereof, a member for connecting and securing the first sleeve member to a first container. A second sleeve member is provided and is so constructed and arranged that it receives a portion of the first sleeve, and is operatively adapted for axial sliding engagement thereon, including at one axial end thereof a member for releasably engaging and securing the second sleeve member to a second container. Piercing members located within an area defined by the first and second sleeves are provided for providing fluid flow from the first container to the second container. The coupling device includes a resilient seal for sealing an end of the second sleeve member, located in said second sleeve member at said end adapted to be connected to said second container.

32 Claims, 1 Drawing Sheet

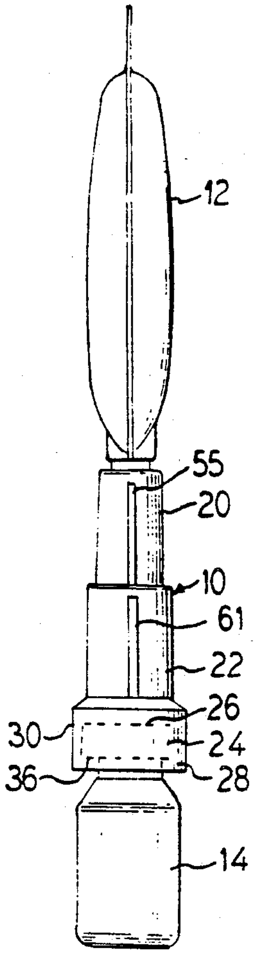
FIG.1
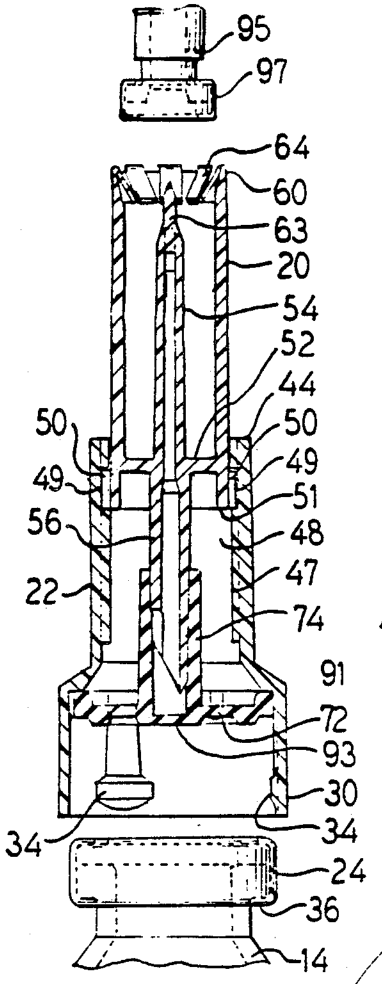
FIG.2
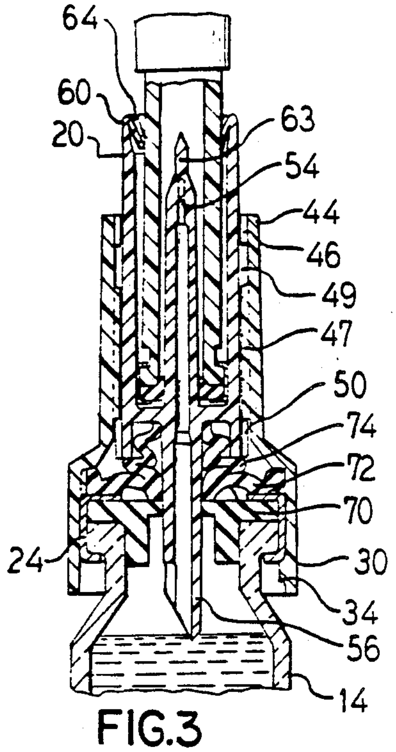
FIG.3
FIG.5
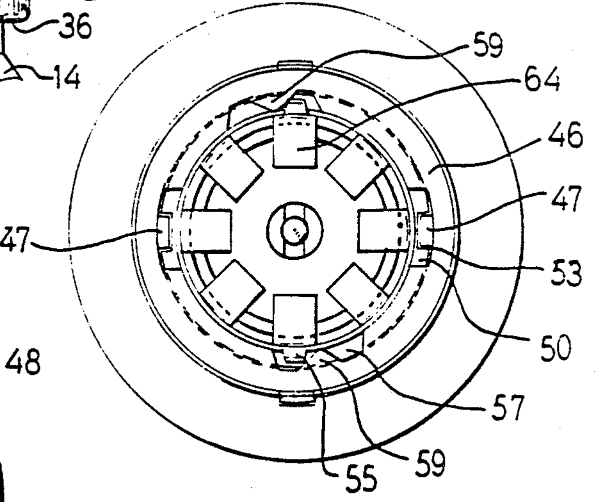
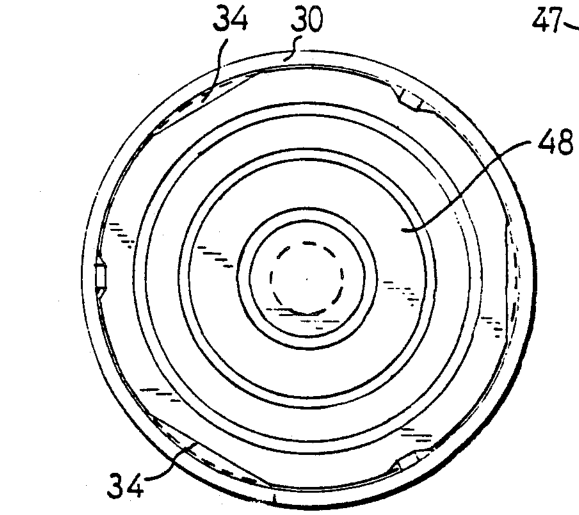
FIG.4
FIG.6
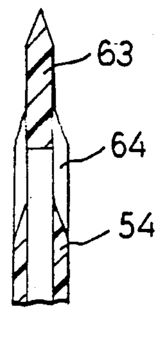
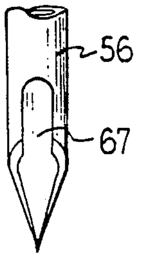
FIG.7

SLIDING RECONSTITUTION DEVICE WITH SEAL

BACKGROUND OF THE INVENTION

The present invention relates generally to the delivery of a beneficial agent to a patient. More specifically, the present invention relates to a device for reconstituting a beneficial agent to be delivered to a patient.

Many drugs are stored in a powdered state, to increase their shelf life for example. In order for powdered drugs to be given intravenously to a patient, the drugs must first be placed in liquid form. To this end, these drugs are mixed or reconstituted with a diluent before being delivered intravenously to a patient. The diluents may be, for example, a dextrose solution, a saline solution, or even water. Typically these drugs are stored in powdered form in glass vials or ampules.

Other drugs, although in a liquid state, must still be diluted before administration to a patient. For example, some chemotherapy drugs are stored in glass vials or ampules, in a liquid state, but must be diluted prior to use. As used herein, reconstitution means to place the powdered drug in a liquid state, as well as, includes the dilution of a liquid drug.

Typically, the powdered drug and diluent are packaged separately. Drugs may be packaged separate from the diluent for various reasons. One of the principal reasons is that many drugs do not retain their chemical and physical stability when mixed with a diluent and thus cannot be stored for any substantial period of time. Furthermore, many companies that make the drug do not make the diluent, and vice versa.

It is necessary for the doctor, pharmacist, nurse, or other medical personnel to mix the drug with diluent prior to use. The reconstitution of the drug presents a number of problems. The reconstitution procedure is time consuming and requires aseptic technique. Furthermore, the proper drug and diluent must be utilized or the product must be disposed of.

The reconstitution procedure should be performed under sterile conditions. In some procedures for reconstituting, maintaining sterile conditions is difficult. Moreover, some drugs, such as chemotherapy drugs, are toxic and exposure to the operator during the reconstitution procedure can be dangerous.

One way of reconstituting a powdered drug is to inject the liquid diluent directly into the drug vial. This can be performed by use of a combination syringe and syringe needle having diluent therein. In this regard, drug vials typically include a pierceable rubber stopper. The rubber stopper of the drug vial is pierced by the needle, and liquid in the syringe is then injected into the vial. The vial is shaken to mix the powdered drug with the liquid. After the liquid and drug are mixed, the resultant liquid is then withdrawn back into the syringe. The syringe is then withdrawn and the drug can then be injected into the patient.

Another method of drug administration is to inject the reconstituted drug, contained in the syringe, into a parenteral solution container. Examples of such containers include the Minibag (TM) flexible parenteral solution container or VIAFLEX (R) flexible parenteral solution container sold by Baxter Healthcare Corporation of Deerfield, Ill. These parenteral solution containers may already have therein dextrose or saline solutions. The drug is injected into the container, mixed with the solution in the parenteral solution container and delivered through an intravenous solution administration set to a vein access site of the patient.

Another method for reconstituting a powdered drug utilizes a reconstitution device sold by Travenol Laboratories, product code No. 2B8064. That device includes a double pointed needle and guide tubes mounted around both ends of the needle. This reconstitution device is utilized to place the drug vial in flow communication with a flexible-walled parenteral solution container. Once the connection is made, liquid in the solution container may be forced into the drug vial by squeezing the solution container. The vial is then shaken. The liquid in the vial is withdrawn by squeezing air from the solution container into the vial. When compression of the flexible walled solution container is stopped, the pressurized air in the vial acts as a pump to force the liquid in the vial back into the solution container.

An improvement to this product is the subject of U.S. Pat. No. 4,607,671 to Aalto et al., assigned to the assignee of the present invention. The device of that invention includes a series of bumps on the inside of a sheath to grip a drug vial. These bumps hinder the inadvertent disconnection of the device and the vial.

U.S. Pat. No. 4,759,756 discloses a reconstitution device wherein, in an embodiment, the reconstitution device includes an improved vial adaptor and bag adaptor that permit the permanent coupling of a vial and liquid container. The bag adaptor can be rotatable relative to the vial adaptor to operate the valve including a stem channel and a base post on the vial adaptor, a base segment channel and a cut out portion of a rim on the bag adaptor and a sealing segment disposed between the vial and the bag adaptor.

Another form of reconstitution device is seen in U.S. Pat. No. 3,976,073 to Quick et al., assigned to the assignee of the present invention. Yet another type of reconstitution device is disclosed in U.S. Pat. No. 4,328,802 to Curley et al., entitled "Wet-Dry Syringe Package" which includes a vial adaptor having inwardly directed retaining projections to firmly grip the retaining cap lip of a drug vial to secure the vial to the vial adaptor. The package disclosed by Curley et al. is directed to reconstituting a drug by use of a syringe.

Other methods for reconstituting a drug are shown, for example, in U.S. Pat. Nos. 4,410,321 to Pearson et al., entitled "Close Drug Delivery System"; 4,411,662 and 4,432,755 to Pearson, both entitled "Sterile Coupling"; and 4,458,733 to Lyons entitled "Mixing Apparatus", all assigned to the assignee of the present invention.

Other related patents include U.S. Pat. No. 3,872,867 to Kilinger entitled "Wet-Dry Additive Assembly"; U.S. Pat. No. 3,841,329 to Kilinger entitled "Compact Syringe"; U.S. Pat. No. 3,826,261 to Kilinger entitled "Vial and Syringe Assembly"; U.S. Pat. No. 3,826,260 to Kilinger entitled "Vial and Syringe Combination"; U.S. Pat. No. 3,378,369 to Kilinger entitled "Apparatus for Transferring Liquid Between a Container and a Flexible Bag"; and German specification DE OS 36 27 231.

In reconstituting a drug, contained in a drug vial, with a diluent, without the use of an intermediary syringe, several problems exist. In some cases, the drug must be packaged separate from the diluent because certain drug's efficacy, in the presence of moisture is short, sometimes as short as 24 hours. Accordingly, once the drug is reconstituted, it must be used in a relatively short time period. Added to this is the fact that drug prescriptions are often changed and therefore, if the drug is reconstituted by the pharmacists, the prescription may change prior to use of the drug. Due to the short efficacy of some drugs, this can result in the drug having to be disposed of.

Because many drugs are very expensive, it would be highly desirable to provide a reconstitution device that would prevent dilution or reconstitution of erroneously selected drugs or diluent; once the drugs are reconstituted or diluted, they must be used.

Further, it can be appreciated that it is highly desirable to provide a device that prevents contamination of the drug in the vial and the puncturing members that puncture the parenteral bag and vial. Also, the connection between the vial and the parenteral bag must be effectively sealed to prevent leakage of the connecting device.

SUMMARY OF THE INVENTION

The present invention provides an improved connector for a reconstitution device. To this end, there is provided a coupling device having a cooperating inner and outer sleeve operatively engaged so that the outer sleeve can slide relatively axially about the inner sleeve. The inner sleeve includes means, at one axial end, for being coupled to a first container, such as, for example, a flexible parenteral bag. The outer sleeve is adapted at one axial end to be releasably connect to a second container, such as, for example, a vial. Piercing means for providing fluid flow from the first and second containers is provided within one of the sleeves. Preferably, the piercing means is located at a second axial end of the inner sleeve and includes oppositely axially directed first and second hollow piercing members that are in fluid communication with each other.

The outer sleeve further includes a seal member located at a position in juxtaposition to the axial end of the outer sleeve that is releasably connected to the second container. Preferably, the seal includes a disc-shaped gasket member, and a resilient sleeve member that projects axially from a central portion of the gasket member, and that operatively seals about the second piercing member.

The seal functions to seal an end of the outer sleeve and prevent any fluid that may be contained therein from leaking out of the outer sleeve. The seal also functions to prevent microbial ingress into the outer sleeve, as well as into the second container when the sleeve is secured to the second container.

In an embodiment, the inner and outer sleeves include means for releasably securing the sleeve member in a first inactivated position or a second activated position. Preferably, the first piercing member is adapted to pierce the receptacle whenever the inner sleeve is connected to the receptacle. Preferably, the second piercing member is adapted to pierce the second container when the inner and outer sleeves are moved from the first inactivated position to the second activated position.

In use, in a preferred embodiment, the inner sleeve, having means for engaging a receptacle, is secured to a port of, for example, a parenteral bag. When so secured, the first piercing member pierces a membrane covering the port. The other axial end of the device is secured to a container, for example, a vial. In the first inactivated position, the second piercing member is spaced apart from the gasket covering the vial, to which the outer sleeve is secured. In the second activated position, however, the second piercing member pierces and extends through the gasket member and into the vial to thereby establish fluid communication between the vial and the parenteral bag.

In an embodiment of the present invention, the second piercing member is received within a sleeve defined by the seal and pierces a membrane enclosing an end of the sleeve prior to penetrating the vial.

In an embodiment of the present invention, the means for releasably securing the inner and outer sleeve member in a first or second position includes a bayonet socket arrangement.

In an embodiment, means are provided for releasably securing the inner and outer sleeves in either a first or second axial position.

In an embodiment, means are provided for releasably securing the inner and outer sleeves in either a first or second rotational position with respect to each other.

In an embodiment, the means for coupling the first sleeve to the receptacle includes a barbed connection. The barbed connection allows a port of the container to be easily received within the first sleeve but prevents same from being removed therefrom.

In an embodiment, the first piercing member includes a solid puncturing means.

In an embodiment, the second piercing member includes an oblique puncturing member.

Additional features and advantages of the present invention will be apparent from the detailed description of the presently preferred embodiments and from the drawings.

BRIEF DESCRIPTION OF THE DRAWINGS

FIG. 1 is an elevational view of a reconstitution device including the connector device of the present invention.

FIG. 2 is a cross-sectional view of the connector device of FIG. 1 illustrating the connector in an inactivated position.

FIG. 3 is a cross-sectional view of the connector device of FIG. 1 illustrating the connector in an activated position.

FIG. 4 is an end view of the connector device of FIG. 1 taken along lines IV—IV of FIG. 2.

FIG. 5 is an end view of the connector device of FIG. 1 taken along lines V—V of FIG. 2.

FIG. 6 is a fragmentary cross-sectional view of the tip of a first piercing member utilized in the connector device of FIG. 1.

FIG. 7 is a fragmentary elevational view of the tip of a second piercing member utilized in the connector device of FIG. 1.

DETAILED DESCRIPTION OF THE PRESENTLY PREFERRED EMBODIMENTS

The present invention provides a connector for use in the proper mixing of two substances, and more particularly, to the reconstitution of drugs, which may be stored in a vial, with a diluent, that may be stored in a flexible medical solution container, and used for the intravenous delivery of a medicament. To this end, the present invention provides a connector that can be secured, at one end to a drug vial or the like, and at a second end, to a container, such as a parenteral container containing a solution, and allows the mixing of the diluent and the drug.

Referring to FIG. 1, the connector device 10 of the present invention is illustrated. The device 10 is adapted to place a container, such as a flexible bag 12 containing a fluid source therein, in fluid communication with a container 14 containing a drug to be reconstituted. The device 10 allows the mixing of the drug and diluent to be performed in an aseptic manner without a contamination of the resultant product.

The container illustrated in FIG. 1 is a flexible bag 12, such as a parenteral bag, of the type normally used in intravenous delivery systems and/or reconstitution devices. However, the bag 12 can be any container that will allow one to reconstitute a product. The second container 14, that contains the drug to be reconstituted, can be a vial or ampule, or any other type of container for containing a product or beneficial agent such as a drug in powdered or liquid form. As discussed above, the vial 14 is connected to the flexible bag 12 so that the agent in the vial 14 can be diluted or reconstituted, depending on whether the agent is in liquid or powdered form.

The connector device 10 includes two sleeve members, a first inner sleeve 20 and a second outer sleeve 22. Preferably, the sleeves are made of a plastic material. The inner and outer sleeves 20 and 22 are so constructed and arranged that they allow relative axial movement therebetween. The sleeves 20 and 22 are adapted to move from a first inactivated position to a second activated position. In a first, inactivated position, illustrated in FIG. 2, the connector device 10 is inactivated and fluid communication is not established between the bag 12 and the vial 14 even though the connector 10 is secured to the bag 12 and vial 14. In a second activated position, illustrated in FIG. 3, the connector device 10 establishes fluid communication between the bag 12 and the vial 14 allowing a drug contained in the vial 14 to be reconstituted.

Typically, the vial 14 will include a neck or projection having an opening that is covered by a rubber stopper or other means for preventing contamination of the drug. The outer sleeve 22 is constructed at one end 28 thereof, so that it can receive and engage the projection or neck 24 of the vial 14. To secure the outer sleeve 22 to the vial, the end 28 of the outer sleeve 22 includes a locking portion. The end 28 has a diameter and length that is designed to receive the neck 24 of the vial 14.

As illustrated in FIG. 2, located on the inside surface of the end portion 28 of the outer sleeve member 22 are a plurality of bumps or flange members 34 that function to releasably lock the end portion 28 on the vial 14. Because the outer sleeve 22 is made of plastic, it has some resiliency and therefore, the vial 14 can be securely engaged within the end portion 28 by urging the rim 32 portion of the vial 14 into the locking end portion 28 until the flange members 34 engage an underside 36 of the rim 32 of the vial 14. During the insertion process, the wall 30 of the end portion 28 of the outer sleeve 22 will give slightly to permit entry of the rim 32 of the vial 14.

As previously stated, the inner sleeve 20 is slidingly mounted within the outer sleeve 22 for relative axial movement therein and to cooperate therewith. To this end, the outer sleeve 22 and the inner sleeve 20 are constructed so as to form two bayonet socket arrangements. One bayonet socket arrangement secures the inner and outer sleeves 20 and 22, respectively, in a first, inactivated position. The other bayonet socket or mount arrangement secures the inner and outer sleeves 20 and 22 in the second, activated position.

To form the first bayonet socket, the outer sleeve 22, at an axial end 44 thereof, includes an inwardly projecting flange 46 formed on an inside wall 48 of the outer sleeve 22. Additionally, the outer sleeve 22 includes a pair of ribs 47 that run axially along a portion of the inside wall 48. The ribs 47 do not extend fully to the flange 46 and define, with the flange 46, a gap 49 therebetween.

The inner sleeve 20 includes an outwardly projecting flange 50 at an axial end 51 that engages and cooperates with the inner ribs 47 and the flange 46 of the outer sleeve 22 to releasably secure the inner sleeve 20 and outer sleeve 22 in a first inactivated position.

The outwardly projecting flange 50 includes two gaps 53 therein that can received the ribs 47. It can be appreciated that as the sleeves 20 and 22 are moved axially relative to each other, the flange 50 will move axially over the ribs 47, with each of the ribs 47 appropriately being received within a respective gap 53. When the ribs 47 are received within the gaps 53, the inner sleeve 20 is prevented from rotating within the outer sleeve 22 but can move axially with respect to the outer sleeve.

The inner sleeve 20 also includes a pair of ridges or ribs 55 that run axially along the sleeve on opposite sides of the outside wall of the inner sleeve 20. These ribs 55 are received within gaps 57 formed in the flange 46. The gaps 57 are sufficiently wide so as to allow a limited amount of relative rotational movement between the inner sleeve 20 and the outer sleeve 22. A detent 59 is located in a center portion of each of the gaps 57 and serves to releasably lock the inner and outer sleeves 20 and 22 in a first or second rotational position. The detents 59 only hinder the relative rotational movement of the inner sleeve 20 by releasably engaging the ribs 55 as they travel from one side of the gaps 57 to the other. Due to the resiliency of the plastic material, a sufficient rotational torque can be exerted to overcome the detents 59 allowing the inner and outer sleeves 20 and 22 to rotate relative to each other.

In a first rotational position, when the flange 50 is positioned within the gap 49 between the outer sleeve ribs 47 and the outer sleeve flange 46, and the gaps 53 are aligned with ribs 47, the inner sleeve 20 and outer sleeve 22 are free to travel axially relative to each other. Thus, in the first rotational position, the inner and outer sleeves 20 and 22 are not locked together. However, by rotating the inner and outer sleeves 20 and 22 relative to each other, when the flange 50 is located within the gap 49, the gap 53 in the flange 50 is caused to rotate so as to no longer be aligned with the ribs 47. When the gaps 53 are no longer aligned with the ribs 47, the inner and outer sleeves 20 and 22 are prevent from moving axially relative to each other because the axial end of the flange 50 abuts against the edges of the ribs 47. Thus, in the second rotational position, the inner and outer sleeves 20 and 22 are locked in the first inactivated position.

A similar, second bayonet socket arrangement is formed at the opposite ends of the ribs 47. However, the top of the vial 14 and seal functions as the equivalent of flange 46 in this arrangement. The top of the vial 14 and ribs 47 define a gap 81 within which flange 50 can be received. Accordingly, once the flange 50 is aligned with the ribs 47, the inner and outer sleeves 20 and 22 can move axially relative to each other until the flange 50 abuts against the seal 70 that is compressed against the top of the vial 14. At that point, the flange 50 is received within a gap formed between the top side of the vial 14 and the edges of the ribs 47. As illustrated in FIG. 3, relative rotation of the inner and outer sleeves 20 and 22 from the first rotational position to the second rotational position again causes misalignment of the gaps 53 relative to the ribs 47. Thus, the inner and outer sleeves 20 and 22 are locked in a second activated position.

As is most clearly illustrated in FIG. 1, in the embodiment of the invention illustrated, the outer sleeve 22 includes a pair of axially extending ribs 61 on the outside wall thereof. The ribs 61 function to provide a better gripping action for a person who is utilizing the connector 10. To this end, the ribs 61 provide a protrusion along what would otherwise be a smooth surface of the outside wall of the outer sleeve 22. The ribs 55 on the inner sleeve 20 also function to assist in gripping the connector 10.

The inner sleeve 20 is partially closed by an end wall 52 located at or near an axial end 51. A first hollow piercing member 54 and a second hollow piercing member 56 are centrally positioned on opposite sides of the end wall 52. As discussed in more detail below, the first and second piercing members 54 and 56 function to pierce the bag 12 and vial 14, respectively, placing same in fluid communication. The first and second piercing members 54 and 56, respectively, extend axially therefrom along the axis of the first sleeve 20. The first and second piercing members 54 and 56, respectively, include hollow interiors that define channels that are in fluid communication with each other through the end wall 52.

The piercing members 54 and 56 are so formed that they do not core when piercing a protective cover that protects an opening of the container 12 or vial 14. Accordingly, the piercing members 54 and 56 provide a high flow rate therebetween. The sleeve members 20 and 22 function, in part, to provide a shroud about the piercing members 54 and 56 to prevent touch contamination of the piercing members by a user.

As illustrated in FIG. 6, in the embodiment of the invention illustrated, the first piercing member 54 is formed so that at the piercing end thereof, it includes a solid tip member 63 for piercing a port, or the like, of a container 12. Due to the construction of the tip member 63, coring by the piercing member 54 is prevented. Instead, the tip member 63 pierces the port membrane of the bag 12 and fluid communication is established via openings 65 located above the tip member 63.

Referring now to FIG. 7, in the embodiment of the invention illustrated, the second piercing member 56 does not have a solid tip. Instead, the second piercing member 56 is hollow throughout and has an oblique end that includes a cut-out portion 67. The cut-out portion 67 allows for the discharge of any cored material.

In the embodiment of the present invention illustrated, the inner sleeve 20 includes at a second axial end 60 means for engaging and securing a receptacle or port 62 of the flexible plastic bag 12. To this end, located within the inside of the second axial end 60 of the inner sleeve 20, are a plurality of locking barbs 64 that engage the port 62 of the flexible plastic bag 12. It can be appreciated that the barbs 64 allow entry of the port 62 into the inner sleeve 20 but prevent retraction of the port 62 therefrom. Thus, the port 62 is securely held within the inner sleeve 20. Due to the construction of the inner sleeve 20 and first piercing member 54, when the port 62 is so received, the first piercing member pierces the membrane of the port allowing fluid flow into the connector 10, and more specifically, into the first and second piercing members 54 and 56, from the bag 12.

The connector 10, and more specifically, the outer sleeve 22, includes a seal 70. Preferably, the seal 70 is a resilient molded rubber member. The seal is located at an end 28 of the outer sleeve 22 and provides improved sealing about the second piercing member 56 and between the vial 14 and outer sleeve 22. The seal 70 functions to prevent the leakage of any fluid that may be contained within the connector out the end 28 of the container. This is especially important if toxic substances, such as some chemotherapy drugs, are being reconstituted. The seal member 70 also functions to reduce microbial ingress into the vial 14 or the connector 10. To this end, the seal 70 seals the end 28 of the outer sleeve 22 preventing microbial ingress into the connector 10. Likewise, when the connector 10 is secured to the vial 14, the seal 70 prevents microbial ingress into the injection site, or opening, of the vial 14.

In the embodiment of the invention illustrated, the molded rubber seal member 70 includes a gasket portion 72 in the form of a disk that effectively covers an end of the outer sleeve 22. In use, when the end 28 is locked onto the vial 14, the gasket portion 72 rests against the top of the vial forming a seal between the opening of the vial 14 and the connector 10.

The seal member 70 further includes a sleeve 74 that is located centrally along the gasket portion 72 and extends axially therefrom toward the second piercing member 56. As illustrated, the sleeve 74 operatively engages and surrounds the second piercing member 56 to provide a seal around the second piercing member 56. As illustrated in FIG. 2, the sleeve 74 terminates at an end 91 that is enclosed by a portion 93 of the gasket. This portion 93 of the gasket 72 forms a membrane that must be penetrated to provide fluid communication between an area located on a first side of the seal 70 and an area located on a second side of the seal. Thus, until the piercing member 56 is inserted through the portion 93 of the gasket 72, the end of the connector 10 is completely sealed.

The sleeve member 74 has a sufficiently small cross-sectional circumference, vis-a-vis the piercing member 56, that when the gasket member 72 is pierced by the piercing member 56, the sleeve member 74 seals about the spike member 56 so that the seal member 70 continues to provide a seal between the vial 14 and the outer sleeve 22.

In use, the connector 10 is secured to a port 95 of a container 12 such as a flexible bag. When so secured, the first piercing member 54 of the connector 10 is received within the port 95 of the flexible plastic bag 12 and pierces the membrane 97. Due to the construction of the connector 10 of the present invention, although the first piercing member 56 has pierced the bag 12 and is in contact with the fluid in the bag 12, the connector and bag can be stored for later use. This is due to the fact that the inner and outer sleeves 20 and 22 are in the first locked rotational position. In fact, the end 28 of the outer sleeve 22 can be locked into the vial 14 and the combination can be stored because the second piercing member 56, in this state, has not yet pierced the gasket member 72 of the seal member 70. At this point, the vial 14 may still be removed or disengaged from the outer sleeve 22. Thus, if the agent within the vial 14 was incorrectly selected, the bayonet socket arrangement formed by the inner and outer sleeves 20 and 22, and specifically, the rib 46 and flange 50 prevents accidental activation, and the vial 14 can be removed and the agent can still be used.

FIG. 3 illustrates the connector 10 in the activated position. This position is obtained by causing the outer sleeve 22 to slide axially relative to the inner sleeve 20 by exerting a force on the vial 14. This force must be sufficient to pierce the gasket member 72. Because the inner and outer sleeves 20 and 22 are operatively mounted for sliding engagement, the outer sleeve 22 will be caused to slide or to be displaced axially relative to the inner sleeve 20. Accordingly, because the second piercing member 56 is fixedly mounted on the end wall of the inner sleeve 20, the opening of the vial 14 will also be caused to be displaced axially relative to the second piercing member 56. As the opening advances toward the second piercing member 56, the second piercing member 56 will penetrate the gasket member 72 and any other seal over the opening. As stated earlier, once the inner and outer sleeves 20 and 22 are in the second activated position, they are rotated relative to each other to secure or lock the sleeves 20 and 22 in the second, activated state.

FIG. 3 illustrates the second piercing member 56 after it has fully penetrated through the portion 93 of the gasket 72 of the seal member 70 and the opening of the vial 14. It can be appreciated, as illustrated, that the sleeve 74 of the seal 70 will be in a slightly deformed state as the end wall of the inner sleeve 20 abuts against the free end of the sleeve member 74 thereby causing it to compress. Additionally, frictional forces between the second piercing member 56 and the sleeve member 74 will cause such deformation.

In the fully activated position, the vial 14 and flexible plastic bag 12 are in fluid communication with each other. At this point, the fluid in the flexible bag 12 can be introduced into the vial 14 to thereby dilute or reconstitute the agent within the vial 14. Once the drug is diluted or reconstituted, the diluted or reconstituted agent can then be used.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A coupling device for establishing fluid communication between a first container and a second container comprising:
   - a first sleeve member including at a first end thereof, means for connecting and securing said first sleeve member to a first container;
   - a second sleeve member, so constructed and arranged that it receives a portion of the first sleeve, and operatively adapted for axial sliding engagement thereon, including means at one axial end thereof for releasably engaging and securing said second sleeve member to a second container;
   - piercing means located within the first and second sleeves and secured to one of the sleeves for providing fluid flow from the first container to the second container; and
   - a resilient seal means for sealing an end of the second sleeve member, located in said second sleeve member at said end adapted to be connected to said second container.

2. The coupling device of claim 1 wherein the seal means includes a gasket that creates a seal between a first area located on one side of the gasket and a second area located on a second side of the gasket.

3. The coupling device of claim 1 wherein the seal member includes a resilient sleeve member extending axially from a portion of the seal member.

4. The coupling device of claim 1 including means for releasably securing the first and second sleeves in a first or second axial position.

5. The coupling device of claim 4 wherein said means for releasably securing said first and second sleeve members includes a bayonet socket arrangement.

6. The coupling device of claim 1 including means for releasably securing the first and second sleeves in a first or second rotational position.

7. The coupling device of claim 1 wherein said means for connecting said first sleeve member to said container includes means for allowing a portion of the container to be received within said first sleeve member but preventing the portion from being released therefrom.

8. The coupling device of claim 1 wherein said seal member is formed of a molded rubber and said first and second sleeve members are made of plastic.

9. The coupling device of claim 1 wherein said piercing means includes two piercing members, one of which is so constructed and arranged that it can pierce the first container and a second of which that is so constructed and arranged that it can pierce the second container.

10. The coupling device of claim 9 wherein said first and second piercing members are made of plastic and are integrally formed with said first sleeve member.

11. The coupling device of claim 9 wherein the first sleeve includes at a second axial end an end wall and the piercing members extend outwardly from opposite sides of the end wall.

12. The coupling device of claim 1 wherein the seal means prevents fluid contained in the second sleeve from leaking out of the coupling device.

13. The coupling device of claim 1 wherein the seal means prevents microbial ingress into the second sleeve member via the second end.

14. A coupling device for establishing fluid communication between a first container and a second container comprising:
   - a first sleeve member having a first end adapted to securely receive a portion of the first container;
   - a pair of oppositely extending first and second hollow piercing members located within and secured to the first sleeve, the piercing members including channels in fluid communication with each other, the first piercing member adapted to pierce the first container and the second piercing member adapted to pierce the second container;
   - a second sleeve member concentrically engaged about said first sleeve member and operatively adapted to axial sliding engagement thereon, the second sleeve including an end for releasably securing the second container;
   - said first and second sleeves cooperating to define means for releasably securing said first and second sleeves in a first or second axial position relative to each other; and
   - a molded rubber seal member located within said second sleeve member in juxtaposition to the end of the second sleeve, said seal defining a seal between a first area within the second sleeve and a second area outside the sleeve.

15. The coupling device of claim 14 wherein the first piercing member includes a solid tip.

16. The coupling device of claim 14 wherein the second piercing member includes an oblique-shaped end.

17. The coupling device of claim 14 wherein the seal includes a gasket extending across a face of the end of the outer sleeve.

18. The coupling device of claim 17 wherein the gasket prevents microbial ingress into the first area and into the second container when the sleeve is secured to the second container.

19. The coupling device of claim 14 wherein the seal includes a sleeve, having a pierceable membrane at one end and an opening at a second end, the sleeve being so constructed and arranged that it receives a portion of the second piercing member.

20. The coupling device of claim 14 wherein said first piercing member extends for a length sufficient to cause the piercing member to pierce a portion of the first container when the first sleeve is secured to the container.

21. The coupling device of claim 14 wherein the means for releasably securing the first and second sleeves in a first or second position includes a flange circumscribing an outer portion of the first sleeve and a flange circumscribing an inner portion of the second sleeve and at least one rib located on the inner portion of the second sleeve.

22. The coupling device of claim 21 wherein flange on the first sleeve includes at least one gap for receiving the rib.

23. The coupling device of claim 21 wherein the flange on the second sleeve includes a gap therebetween for receiving the flange on the first sleeve.

24. The coupling device of claim 23 wherein the gap on the first sleeve includes means for limiting the rotational movement of the first sleeve with respect to the second sleeve.

25. The coupling device of claim 14 including means for releasably securing the first and second sleeves in a first or second rotational position with respect to each other.

26. A connector mixing two products comprising:

first and second sleeves operatively adapted for limited rotation and axial movement relative to each other, the second sleeve member concentrically located about the first sleeve member;

means formed at an axial end of the first sleeve for securing the first sleeve member to a container;

means formed at an axial end of the second sleeve for releasably connecting the second sleeve to a second container;

the first and second sleeves defining means for releasably securing the first and second sleeve members in a first axial position or a second axial position and securing the sleeves in a first rotational position or a second rotational position;

first and second piercing members located within and secured to the first sleeve, the first piercing member adapted to pierce the first container when the first sleeve member is connected to the container, the second piercing member adapted to pierce the second container when the container is secured to the second sleeve and the sleeves are in a second axial position; and a molded rubber seal member located in the second sleeve member and having a disc-shaped gasket member adapted to cover and seal the outer sleeve.

27. The connector of claim 26 wherein the seal includes a resilient sleeve extending axially from a center portion of the gasket that operatively surrounds and seals the second piercing member.

28. The connector of claim 27 wherein the sleeve includes a pierceable membrane at an end thereof.

29. The coupling device of claim 26 wherein the means for releasably securing the first and second sleeves in a first or second position includes a flange circumscribing an outer portion of the first sleeve and a flange circumscribing an inner portion of the second sleeve and at least one rib located on the inner portion of the second sleeve.

30. The coupling device of claim 29 wherein the flange on the second sleeve includes a gap therebetween for receiving the flange on the first sleeve.

31. The coupling device of claim 30 wherein the gap on the first sleeve includes means for limiting the rotational movement of the first sleeve with respect to the second sleeve.

32. The coupling device of claim 26 wherein flange on the first sleeve includes at least one gap for receiving the rib.

* * * * *

UNITED STATES PATENT AND TRADEMARK OFFICE

CERTIFICATE OF CORRECTION

PATENT NO. : 4,898,209

DATED : February 6, 1990

INVENTOR(S) : Brian D. Zdeb

It is certified that error appears in the above-identified patent and that said Letters Patent is hereby corrected as shown below:

On title page under "United States Patent [19]", "Zbed" should read --Zdeb--.

On title page at [75], "Inventor: Brian D. Zbed" should read --Inventor: Brian D. Zdeb--.

In column 10, at line 59, delete "to" and substitute --for-- therefor.

In column 11, at line 46, after "connector" insert --for--.

Signed and Sealed this

Second Day of July, 1991

*Attest:*

HARRY F. MANBECK, JR.

*Attesting Officer*

*Commissioner of Patents and Trademarks*